United States Patent
Koh et al.

(10) Patent No.: US 10,399,561 B2
(45) Date of Patent: Sep. 3, 2019

(54) LIMP-HOME CONTROL METHOD AND SYSTEM FOR HYBRID VEHICLE

(71) Applicants: HYUNDAI MOTOR COMPANY, Seoul (KR); KIA MOTORS CORPORATION, Seoul (KR)

(72) Inventors: Deuk Hoon Koh, Incheon (KR); Tae Hee Jung, Seongnam-si (KR); Hyun Min Park, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 129 days.

(21) Appl. No.: 15/818,527

(22) Filed: Nov. 20, 2017

(65) Prior Publication Data
US 2018/0304882 A1    Oct. 25, 2018

(30) Foreign Application Priority Data
Apr. 19, 2017   (KR) .......................... 10-2017-0050234

(51) Int. Cl.
| | |
|---|---|
| *B60W 20/50* | (2016.01) |
| *B60W 10/02* | (2006.01) |
| *B60W 10/06* | (2006.01) |
| *B60W 10/08* | (2006.01) |
| *B60K 6/48* | (2007.10) |

(52) U.S. Cl.
CPC .......... *B60W 20/50* (2013.01); *B60W 10/02* (2013.01); *B60W 10/06* (2013.01); *B60W 10/08* (2013.01); *B60K 6/48* (2013.01); *B60W 2510/0638* (2013.01); *B60W 2510/081* (2013.01); *B60W 2510/242* (2013.01); *B60W 2710/021* (2013.01); *B60Y 2200/92* (2013.01); *B60Y 2306/13* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 2001/0004029 A1* | 6/2001 | Wakashiro | ............. | B60K 6/485 180/170 |
| 2002/0063000 A1* | 5/2002 | Kojima | .................... | B60K 6/48 180/65.1 |

FOREIGN PATENT DOCUMENTS

KR    10-2012-0063299 A    6/2012

* cited by examiner

*Primary Examiner* — Richard M Camby
(74) *Attorney, Agent, or Firm* — Morgan, Lewis & Bockius LLP

(57) ABSTRACT

A limp-home control method and a system for hybrid vehicles which can minimize vehicle vibration (jerk) and improve operability by driving an engine with counter electromotive force and locking up an engine clutch with a difference between an engine speed and a motor speed minimized when a high voltage to an inverter is interrupted due to a failure of a high voltage system of the hybrid vehicle.

8 Claims, 2 Drawing Sheets

LIMP-HOME CONTROL METHOD AND SYSTEM FOR HYBRID VEHICLE

CROSS-REFERENCE TO RELATED APPLICATION

This application claims the priority benefit of Korean Patent Application No. 10-2017-0050234, filed on Apr. 19, 2017, with the Korean Intellectual Property Office, the disclosure of which is incorporated herein by reference.

TECHNICAL FIELD

The present disclosure relates to a limp-home control method and system for hybrid vehicles, and more particularly, to a limp-home control method and system for hybrid vehicles which can minimize vehicle vibration (jerk) and improve operability by driving the engine with counter electromotive force and locking up the engine clutch with the difference between the engine speed and a motor speed minimized when a high voltage to an inverter is interrupted due to failure of a high voltage system of the hybrid vehicle.

BACKGROUND

A parallel hard-type hybrid system has an operation mode in which power is transmitted by driving an engine and a motor at a synchronous speed by locking up the engine and the motor to each other through lock-up of the engine clutch, and an operation mode (EV mode) in which the engine clutch is opened and the motor transmits power with the engine stopped.

When a high voltage that is supposed to be applied to an inverter is suddenly interrupted due to an occurrence of abnormality in the vehicle during the operation mode (EV mode), in which the vehicle is driven only by the motor with the engine turned off, the engine needs to be driven for limp-home driving of the vehicle as a fail-safe strategy. In other words, a hybrid starter generator (HSG) serves to start the engine by using a pulley and a belt connected to the engine in a normal situation, but when an input of a high voltage is interrupted, the HSG cannot be normally driven. In this case, in conventional cases, the engine is started by attempting lock-up through the motor kept rotating at a high speed, the stationary engine and slip control of the engine clutch. At this time, vibration (jerk) occurs in the vehicle as the engine in a stationary state is joined to the motor rotating at a high speed to start the engine.

Therefore, there is a need for solutions for minimizing vibration of the vehicle in joining the motor to the engine before entering the limp-home mode and for enhancing operability in a situation where a high voltage to the inverter is interrupted due to abnormal operation of the high voltage system of the hybrid vehicle.

The foregoing description of the background art is merely intended to promote an understanding of the background of the present invention and is not to be construed as suggesting that the present invention corresponds to a conventional technology already known to those skilled in the art.

SUMMARY

Therefore, the present disclosure has been made in view of the above problems, and it is an object of the present disclosure to provide a limp-home control method and system for a hybrid vehicle which can minimize vehicle vibration (jerk) and improve operability by driving the engine with counter electromotive force and locking up the engine clutch with the difference between the engine speed and the motor speed minimized when a high voltage is not applied to an inverter due to failure of a high voltage system of the hybrid vehicle.

In accordance with an aspect of the present disclosure, the above and other objects can be accomplished by the provision of a limp-home control method for a hybrid vehicle, including when power is not supplied by a high voltage power system during driving of the vehicle in an electric vehicle mode by a first motor generator, driving, by a controller, a second motor generator for driving an engine using counter electromotive force of a first motor generator, starting, by the controller, the engine according to driving of the second motor generator, and driving, by the controller, the vehicle in a limp-home mode according to start of the engine.

The power may not be supplied by the high voltage power system in the driving of the second motor generator when high-voltage power of the high voltage power system is not supplied to an inverter configured to control the first and second motor generators.

In the driving of the second motor generator, the counter electromotive force may be generated when the first motor generator rotates while being connected to a drive shaft of the vehicle.

The driving of the second motor generator may include determining, by the controller, whether the counter electromotive force of the first motor generator has a voltage magnitude for driving the second motor generator, and providing, by the controller, the counter electromotive force as a driving power of the second motor generator when it is determined that the counter electromotive force has the voltage magnitude for driving the second motor generator.

The limp-home control method may further include measuring, by the controller, a speed of the engine and a speed of the first motor generator after the starting of the engine, and determining, by the controller, whether a difference between the measured speed of the engine and the measured speed of the first motor generator is less than or equal to a set value, wherein the driving of the vehicle in the limp-home mode may include when difference between the measured speed of the engine and the measured speed of the first motor generator is less than or equal to the set value, locking up, by the controller, an engine clutch and transmitting power of the engine to a drive shaft of the vehicle.

In accordance with another aspect of the present disclosure, a limp-home control system for a hybrid vehicle includes an engine configured to generate power through combustion of fuel, a first motor generator configured to generate power with electric energy supplied thereto, an engine clutch configured to engage or disengage the engine to or from the first motor generator, a high voltage power system configured to store electrical energy, a second motor generator configured to provide the engine with power for starting the engine in a stationary state, an inverter configured to convert direct current (DC) power stored in the high voltage power system into alternating current (AC) power and provide the power to the first motor generator and the second motor generator, and a controller configured to drive the engine using counter electromotive force of the first motor generator, start the engine by operation of the second motor generator and drive the vehicle in a limp-home mode according to start of the engine when power is not supplied from the high voltage power system during driving of the vehicle in an electric vehicle mode by the first motor generator.

The controller may determine whether the counter electromotive force of the first motor generator has a voltage magnitude for driving the second motor generator and provide the counter electromotive force as driving power of the second motor generator when it is determined that the counter electromotive force has the voltage magnitude for driving the second motor generator.

The controller may measure a speed of the engine and a speed of the first motor generator after starting the engine, and determines whether a difference between the measured speed of the engine and the measured speed of the first motor generator is less than or equal to a set value, wherein, when the difference between the measured speed of the engine and the measured speed of the first motor generator is less than or equal to the set value, the controller may lock-up an engine clutch to transmit power of the engine to a drive shaft of the vehicle.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to various embodiments of a limp-home control method and system for a hybrid vehicle of the present disclosure, examples of which are illustrated in the accompanying drawings. Wherever possible, the same reference numbers will be used throughout the drawings to refer to the same or like parts.

Figure 1:
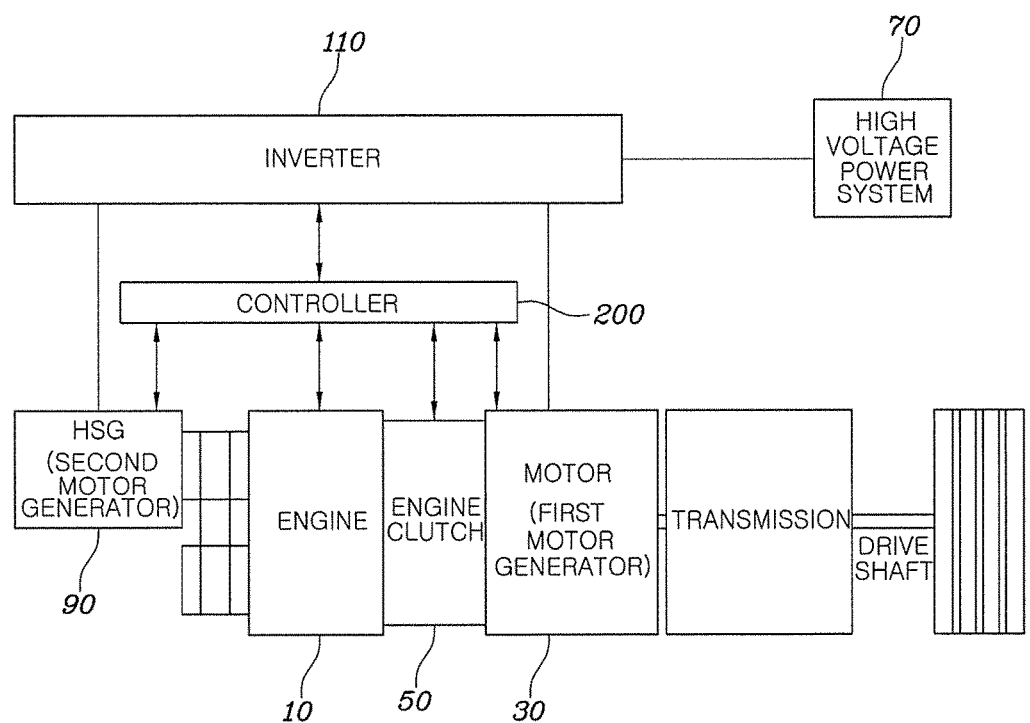
FIG. 1 is a block diagram illustrating a limp-home control system of a hybrid vehicle according to an embodiment of the present disclosure.
Figure 2:
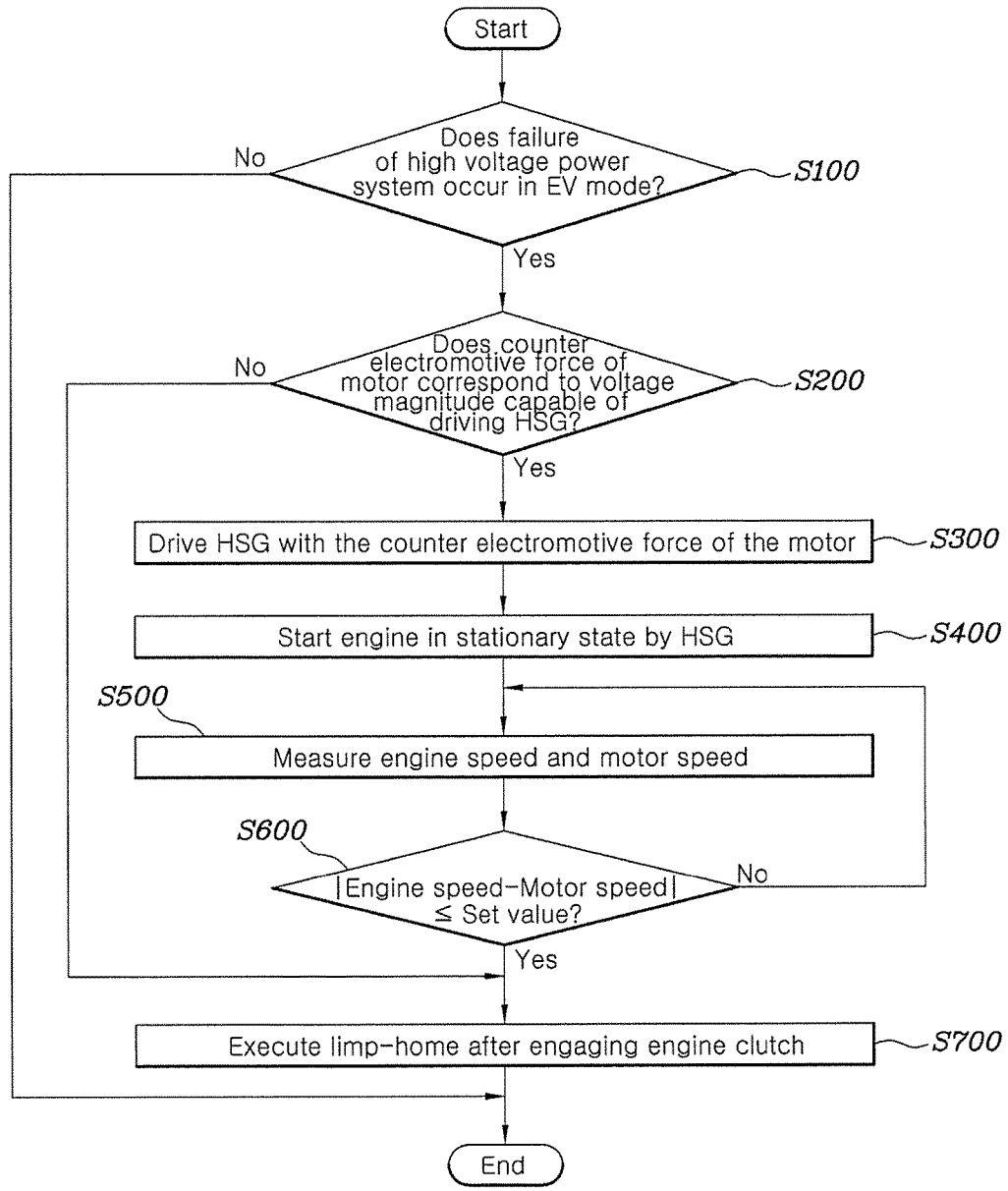
FIG. 2 is a flowchart illustrating a limp-home control method for a hybrid vehicle according to an embodiment of the present disclosure.

FIG. 1 is a block diagram illustrating a limp-home control system of a hybrid vehicle according to an embodiment of the present disclosure, and FIG. 2 is a flowchart illustrating a limp-home control method for a hybrid vehicle according to an embodiment of the present disclosure.

Referring to FIG. 1, a limp-home control system for a hybrid vehicle according to an embodiment of the present disclosure may include: an engine 10 configured to generate power through combustion of fuel; a first motor generator 30 configured to generate power with electric energy supplied thereto; an engine clutch 50 configured to engage or disengage the engine 10 to or from the first motor generator 30; a high voltage power system 70 configured to store electrical energy; a second motor generator 90 configured to provide the engine 10 with power for starting the engine 10 in the stationary state; an inverter 110 configured to convert the DC power stored in the high voltage power system 70 into AC power and provide the power to the first motor generator 30 and the second motor generator 90; and a controller 200 configured to drive the engine 10 using counter electromotive force of the first motor generator 30, start the engine 10 by operation of the second motor generator 90 and drive the vehicle in a limp-home mode according to start of the engine 10 when power is not supplied from the high voltage power system 70 during driving of the vehicle in an electric vehicle mode by the first motor generator 30.

The controller 200 is an electric circuitry that executes instructions of software which thereby performs various functions described hereinafter.

Here, the hybrid vehicle may be of a parallel hard type as an embodiment of the present disclosure, and the engine 10 and the first motor generator 30 can be engaged with or disengaged from each other by the engine clutch 50. The operation modes of the hybrid vehicle may include an operation mode (HEV mode) in which the engine 10 and the first motor generator 30 are engaged with each other by the engine clutch 50 to transmit power to the drive shaft of the vehicle at a synchronous speed and an operation mode (EV mode) in which the engine clutch 50 is opened, the motor 10 stops, and the first motor generator 30 is driven to transmit power to the drive shaft of the vehicle.

The high voltage power system 70 may include a high voltage battery, a relay, a battery management system (BMS), and may supply power to a driving system of the vehicle.

The inverter 110 may receive AC power from the high voltage power system 70, convert the AC power into DC power and supply the DC power to the first motor generator and the second motor generator (hybrid starter generator (HSG)) 90.

The first motor generator 30, which is a motor, may receive AC power from the inverter 110 and generate and transmit power to the drive shaft of the vehicle.

The second motor generator 90 is a hybrid starter generator (HSG), and may be connected to the engine 10 through a pulley and a belt to start the engine 10, output driving power, or charge a battery.

The engine 10 may be started by the second motor generator (HSG) 90 and be engaged with the first motor generator 30 by the engine clutch 50 to transmit power to the drive shaft of the vehicle.

The controller 200 may include a vehicle control unit (HCU) configured to control the second motor generator (HSG) 90 for controlling the engine 10 to stop, a motor control unit (MCU) configured to control the second motor generator (HSG) 90 and the first motor generator 30, a transmission control unit (TCU) configured to perform transmission control, and an engine management system (EMS) configured to control torque of the engine 10.

When supply of power from the high voltage power system 70 is interrupted during operation of the vehicle by the first motor generator 30 in the electric vehicle mode, the controller 200 may control the engine 10 using counter electromotive force of the first motor generator 30, start the engine 10 through operation of the second motor generator 90, and drive the vehicle in the limp-home mode according to start of the engine 10.

Here, when no power is supplied by the high voltage power system 70, power is not supplied to the inverter 110 that controls the first and second motor generators 30 and 90. According to an embodiment, this event may occur when a connector connecting the high voltage battery and the inverter 110 is disconnected by external force or the software of the BMS fails to perform a normal fail-safe operation, and thus application of a high voltage is obstructed.

When a high voltage is not applied to the inverter 110 due to failure of the high voltage power system 70 in the electric vehicle mode (EV mode), AC power will not be supplied to the first motor generator 30. In this case, the first motor generator 30 generates counter electromotive force by rotational inertia, and the controller 200 converts the counter electromotive force into AC power through the inverter 110 and supplies the AC power as the driving power of the second motor generator (HSG) 90, thereby staring the engine 10 which is stationary.

According to an embodiment, in the event that failure occurs in the high voltage power system 70 in the EV mode in which the engine clutch 50 is opened, the engine 10 is stopped, and the first motor generator 30 is driven to transmit power to the drive shaft of the vehicle, the controller 200 may cause the counter electromotive force obtained by rotational inertia of the first motor generator 30 to be supplied as the driving power of the second motor generator 90 of the engine 10 to start the stationary engine 10 and lock-up the engine clutch 50 to transmit the power of the engine 10 to the drive shaft of the vehicle.

The controller 200 may determine whether the counter electromotive force of the first motor generator 30 has a voltage magnitude for driving the second motor generator 90. If it is determined that the counter electromotive force has the voltage magnitude for driving the second motor generator 90, the controller 200 may provide the counter electromotive force to the second motor generator 90 as the driving power.

Here, the voltage capable of driving the second motor generator 90 of the engine 10 is a minimum voltage for driving the second motor generator (HSG) 90 at a speed higher than or equal to a predetermined speed, and may be set differently according to vehicle type. The controller 200 may sense the counter electromotive force generated by the rotational inertia of the first motor generator 30 and stored in a capacitor in the inverter 110. If the controller 200 determines that the counter electromotive force is greater than or equal to the magnitude of the minimum voltage for driving the second motor generator 90 of the engine 10, the controller 200 may convert the DC counter electromotive force stored in the capacitor into AC power through the inverter and supply the AC power as driving power of the second motor generator 90.

According to an embodiment, the controller 200 measures the speed of the engine 10 and the speed of the first motor generator 30 after starting the engine 10, and determines whether a difference between the measured speed of the engine 10 and the measured speed of the first motor generator 30 is less than or equal to a set value. When the difference between the measured speed of the engine 10 and the measured speed of the first motor generator 30 is less than or equal to a set value, the controller 200 may lock-up the engine clutch 50 to transmit the power of the engine 10 to the drive shaft of the vehicle.

Here, the set value may be set by the user. According to an embodiment, the set value set may be 0. The time at which the difference between the measured speed of the engine 10 and the measured speed of the first motor generator 30 is less than or equal to the set value is the time at which the difference in speed is minimized. In an embodiment of the present disclosure, limp-home may be performed with the engine 10 by locking up the engine clutch 50 at the time when the difference in speed between the engine 10 and the first motor generator 30 is minimized to 0 or a value close to 0. Thereby, vehicle vibration (jerk) may be minimized, and vehicle operability may be improved.

Referring to FIG. 2, a limp-home control method for a hybrid vehicle according to an embodiment of the present disclosure may include: driving a second motor generator for driving the engine using the counter electromotive force of a first motor generator when power is not supplied by a high voltage power system during driving of the vehicle in an EV mode by a first motor generator (S100, S300); starting the engine according to driving of the second motor generator (S400); and driving the vehicle in the limp-home mode according to start of the engine (S700).

In operations S100 and S300 of driving the second motor generator, it is first determined whether failure occurs in the high voltage power system while the hybrid vehicle is traveling in the EV mode (S100).

According to an embodiment, the EV mode may be a mode in which the engine clutch is opened, the engine is stopped, and the first motor generator is driven to transmit power to the drive shaft of the vehicle. According to an embodiment, the failure of the high voltage power system may occur when a connector connecting the high voltage battery and the inverter is disconnected by external force or the software of the BMS fails to perform a normal fail-safe operation, and thus application of a high voltage is obstructed. In this case, since the high voltage is not applied to the inverter, AC power is not supplied to the first motor generator. Thereby the first motor generator generates counter electromotive force by the rotational inertia. Since the second motor generator HSG cannot be driven directly by the counter electromotive force, it is determined whether the counter electromotive force generated by the rotational inertia of the first motor generator has a voltage magnitude capable of driving the second motor generator HSG of the engine (S200).

Here, the voltage magnitude capable of driving the second motor generator HSG of the engine is the magnitude of a minimum voltage for driving the second motor generator HSG at a vehicle speed higher than or equal to a predetermined speed, and may be set differently according to vehicle type. In an embodiment of the present disclosure, the generated counter electromotive force may be stored in a capacitor in the inverter. The controller senses the counter electromotive force and compares the same with the magnitude of the minimum voltage for driving the second motor generator HSG. When it is determined that the counter electromotive force is greater than or equal to the magnitude of the minimum voltage for driving the second motor generator HSG, the controller converts the DC counter electromotive force stored in the capacitor into AC power through the inverter and supplies the AC power as driving power of the second motor generator (S200, S300).

The engine may be started by driving the second motor generator (S400).

Here, as the engine is started by the second motor generator HSG, the engine speed may increase, and the rotational speed of the first motor generator may decrease since the generated counter electromotive force is consumed by driving of the second motor generator HSG.

In an embodiment of the present disclosure, after the engine in the stationary state is started by the second motor generator HSG, the engine speed and the speed of the first motor generator are measured by the controller (S500).

Here, in operation S500 of measuring the engine speed and the speed of the first motor generator, the speeds of the engine and the first motor generator may be measured by setting a period, and may be monitored for a predetermined time.

According to an embodiment, the limp-home control method for a hybrid vehicle may further include determining whether the difference between the measured engine speed and the measured speed of the first motor generator speed is less than or equal to a set value (S600).

Here, if the difference between the measured engine speed and the measured speed of the first motor generator speed is less than or equal to the set value, the time at which the difference in speed between the engine and the first motor generator is minimized is determined. The set value may be set by the user. According to an embodiment, the set value set may be 0 (which is the case where the engine speed is equal to the speed of the first motor generator).

In one embodiment of the present disclosure, limp-home may be performed with the engine by locking up the engine clutch at the time when the difference in speed between the engine and the first motor generator is minimized to 0 or a value close to 0 (S700). Thereby, vehicle vibration (jerk) may be minimized, and vehicle operability may be improved.

If the difference between the measured engine speed and the measured speed of the first motor generator is greater than the set value, the process goes back to the operation S500 of measuring the engine speed and the speed of the first motor generator to determine whether the difference between the engine speed and the speed of the first motor generator satisfies the condition. That is, since the engine speed increases and the speed of the first motor generator decreases from the moment at which the engine is started by the second motor generator HSG, the controller measures or monitors the engine speed and the speed of the first motor generator until the difference between the engine speed and the speed of the first motor generator becomes less than or equal to the set value.

As described above, a limp-home control method and system for a hybrid vehicle according to various embodiments of the present disclosure can minimize vehicle vibration (jerk) and improve operability of the vehicle by driving the engine with counter electromotive force and locking up the engine clutch with the difference between the engine speed and the motor speed minimized when a high voltage to an inverter is interrupted due to failure of a high voltage system of the hybrid vehicle.

As is apparent from the above description, with a limp-home control method and system for a hybrid vehicle according to embodiments of the present disclosure, vehicle vibration (jerk) can be minimized and operability can be improved by driving the engine with counter electromotive force and locking up the engine clutch with the difference between the engine speed and the motor speed minimized when a high voltage to an inverter is interrupted due to failure of a high voltage system of the hybrid vehicle.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A limp-home control method for a hybrid vehicle, comprising:
    when power is not supplied by a high voltage power system during driving of the vehicle in an electric vehicle mode by a first motor generator, driving, by a controller, a second motor generator for driving an engine using counter electromotive force of the first motor generator;
    starting, by the controller, the engine according to driving of the second motor generator; and
    driving, by the controller, the vehicle in a limp-home mode according to start of the engine.

2. The limp-home control method according to claim 1, wherein the power is not supplied by the high voltage power system in the driving of the second motor generator when high-voltage power of the high voltage power system is not supplied to an inverter configured to control the first and second motor generators.

3. The limp-home control method according to claim 1, wherein, in the driving of the second motor generator, the counter electromotive force is generated when the first motor generator rotates while being connected to a drive shaft of the vehicle.

4. The limp-home control method according to claim 1, wherein the driving of the second motor generator comprises:
    determining, by the controller, whether the counter electromotive force of the first motor generator has a voltage magnitude for driving the second motor generator; and
    providing, by the controller, the counter electromotive force as a driving power of the second motor generator when it is determined that the counter electromotive force has the voltage magnitude for driving the second motor generator.

5. The limp-home control method according to claim 1, further comprising:
    measuring, by the controller, a speed of the engine and a speed of the first motor generator after the starting of the engine and determining, by the controller, whether a difference between the measured speed of the engine and the measured speed of the first motor generator is less than or equal to a set value,
    wherein the driving of the vehicle in the limp-home mode comprises:
    when difference between the measured speed of the engine and the measured speed of the first motor generator is less than or equal to the set value, locking up, by the controller, an engine clutch and transmitting power of the engine to a drive shaft of the vehicle.

6. A limp-home control system for a hybrid vehicle, comprising:
    an engine configured to generate power through combustion of fuel;
    a first motor generator configured to generate power with electric energy supplied thereto;
    an engine clutch configured to engage or disengage the engine to or from the first motor generator;
    a high voltage power system configured to store electrical energy;
    a second motor generator configured to provide the engine with power for starting the engine in a stationary state;
    an inverter configured to convert direct current (DC) power stored in the high voltage power system into alternating current (AC) power and provide the converted power to the first motor generator and the second motor generator; and
    a controller configured to drive the second motor generator using counter electromotive force of the first motor generator, start the engine by operation of the second motor generator and drive the vehicle in a limp-home mode according to start of the engine when power is not supplied from the high voltage power system during driving of the vehicle in an electric vehicle mode by the first motor generator.

7. The limp-home control system according to claim 6, wherein the controller determines whether the counter electromotive force of the first motor generator has a voltage magnitude for driving the second motor generator and provides the counter electromotive force as driving power of the second motor generator when it is determined that the counter electromotive force has the voltage magnitude for driving the second motor generator.

8. The limp-home control system according to claim 6, wherein the controller measures a speed of the engine and a speed of the first motor generator after starting the engine, and determines whether a difference between the measured speed of the engine and the measured speed of the first motor generator is less than or equal to a set value, and wherein, when the difference between the measured speed of the engine and the measured speed of the first motor generator is less than or equal to the set value, the controller locks up the engine clutch to transmit power of the engine to a drive shaft of the vehicle.

* * * * *